Figure 1:
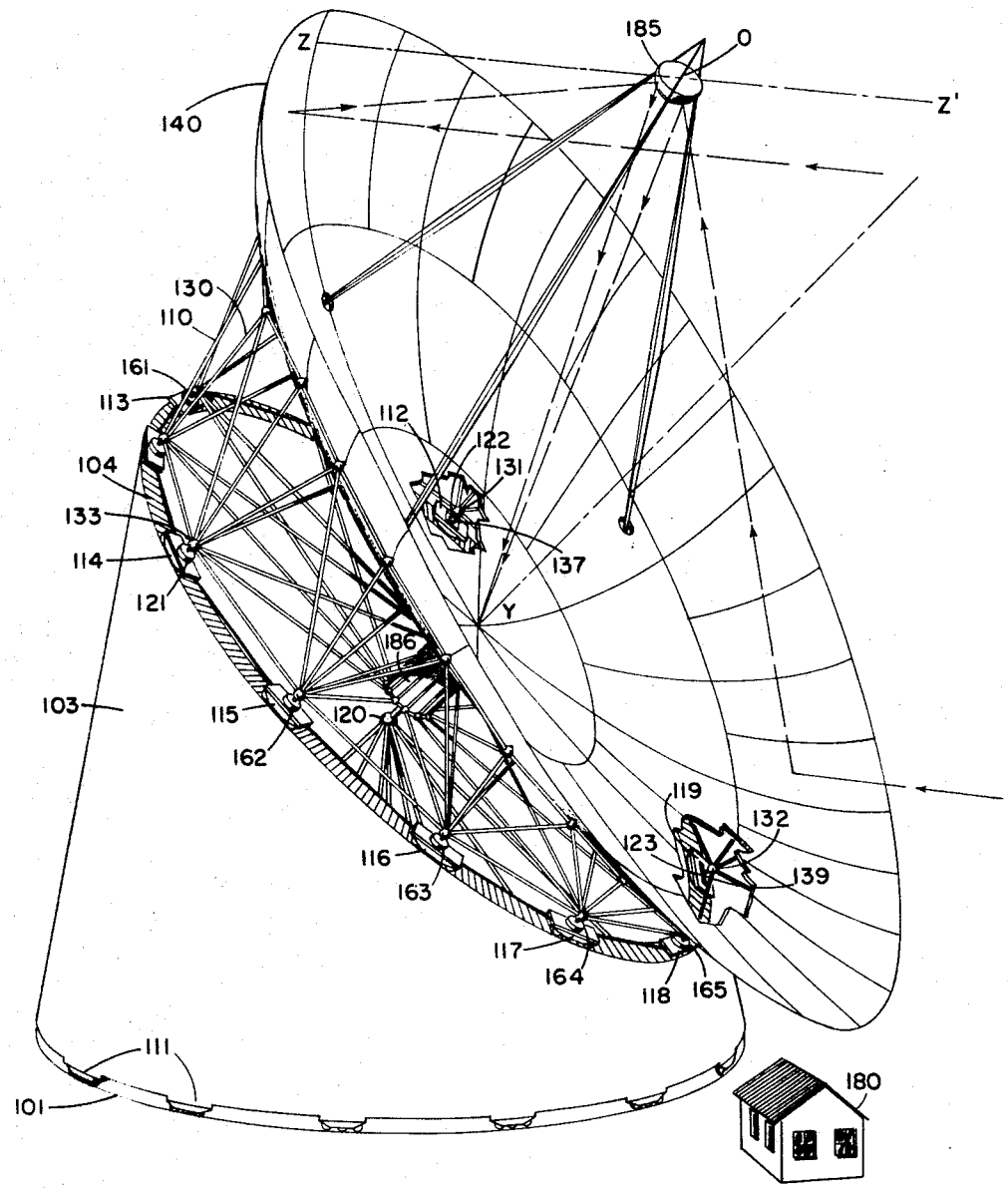

July 9, 1968  P. N. BOWDITCH  3,392,398
RADIO TELESCOPE

Filed March 23, 1961  8 Sheets-Sheet 1

PHILIP N. BOWDITCH *INVENTOR.*

BY *Jack Larsen*

ATTORNEY

July 9, 1968     P. N. BOWDITCH     3,392,398
RADIO TELESCOPE

Filed March 23, 1961     8 Sheets-Sheet 2

PHILIP N. BOWDITCH *INVENTOR.*

BY *Jack Larsen*
ATTORNEY

July 9, 1968  P. N. BOWDITCH  3,392,398
RADIO TELESCOPE

Filed March 23, 1961  8 Sheets-Sheet 3

INVENTOR.
PHILIP N. BOWDITCH
BY Jack Larsen
ATTORNEY

PHILIP N. BOWDITCH INVENTOR.

BY Jack Larsen
ATTORNEY

July 9, 1968  P. N. BOWDITCH  3,392,398
RADIO TELESCOPE
Filed March 23, 1961 8 Sheets-Sheet 5

PHILIP N. BOWDITCH *INVENTOR.*
BY *Jack Larsen*
ATTORNEY

PHILIP N. BOWDITCH INVENTOR.

BY Jack Larsen
ATTORNEY

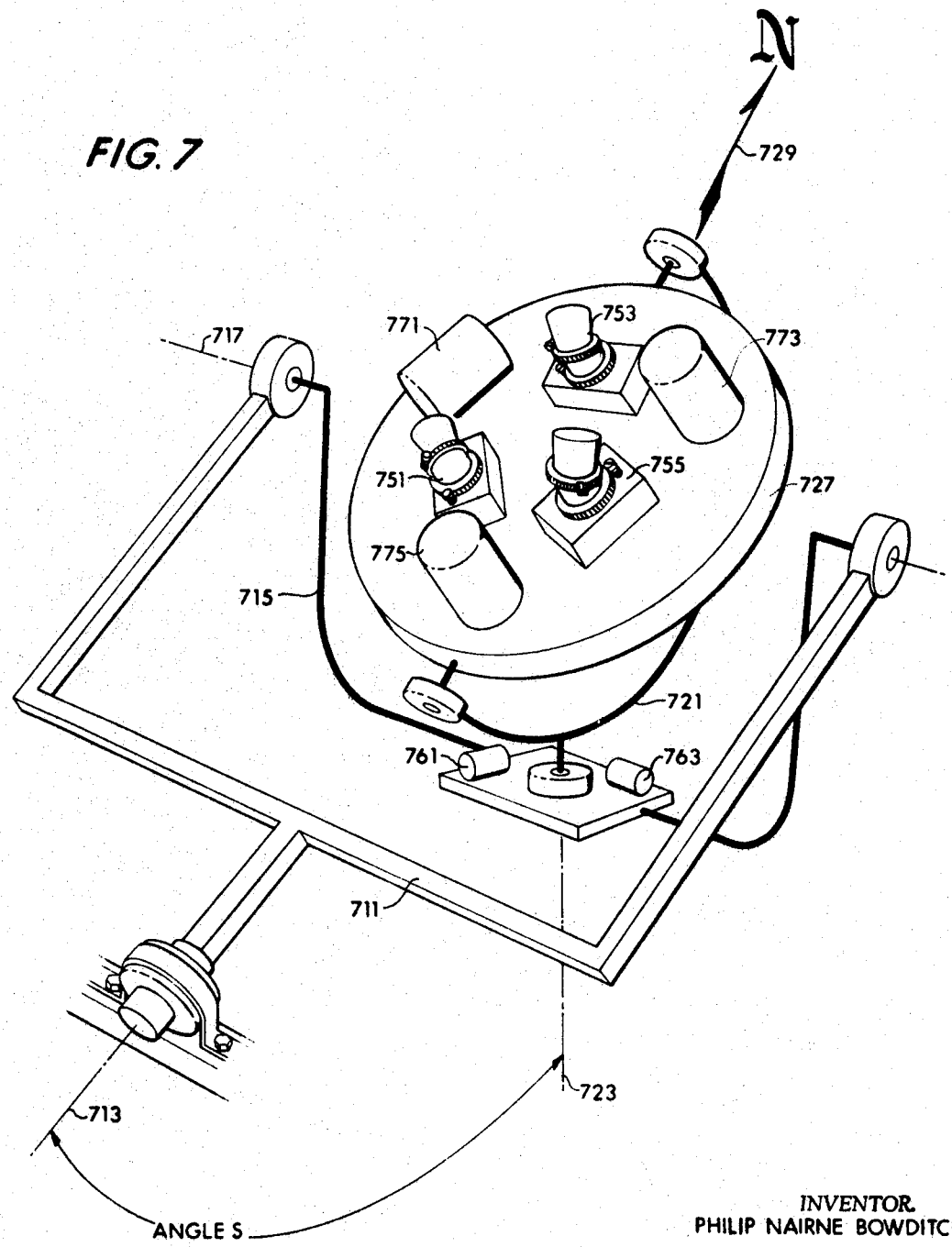

United States Patent Office 3,392,398
Patented July 9, 1968

3,392,398
RADIO TELESCOPE
Philip N. Bowditch, Cohasset, Mass., assignor, by mesne assignments, to the United States of America
Filed Mar. 23, 1961, Ser. No. 97,796
3 Claims. (Cl. 343—765)

This invention relates to radio telescopes, particularly to radio telescopes of extremely large aperture and more particularly to novel features of such telescopes which minimize the weight of moving structure and improve the accuracy of the system.

A form of radio telescope which is favored by many investigators consists of a single large parabolic reflector with a radio receiver located at the focus of the parabola. Useful information has been obtained from fixed parabolic reflectors which scan the sky as the earth rotates. Of more general usefulness is a parabolic reflector which is movably mounted so that its focus on a fixed portion of the heavens may be maintained as the earth rotates; and of even greater usefulness is one which may also follow the flight of satellites and space vehicles.

Telescopes designed to be aimed at a fixed point in space are customarily carried in what is termed an "equatorial mount," a two axis system with one axis parallel to the spin axis of the earth so that a constant time rate drive on this axis provides the desired aiming function. The equatorial mount is mechanically awkward and impractical for antennas of very large aperture. Moreover, if space vehicles are to be tracked, more complex power drives are necessary and the simple earth's rate time drive loses its attractiveness.

The most practical alternative is for the outer-most axis of a large telescope to be an azimuth axis. A number of large telescopes have been built with this (azimuth and elevation) two-axis system. Large gun mounts are pointed with this two-axis system and provide a substantial background of engineering practice; in fact some telescope mounts have been made by reworking gun mounts. One substantial limitation of the gun-mount type of azimuth and elevation system is an inability to track through the vertical. Another undesirable consequence of a configuration which requires that the inner (i.e., altitude) axis be substantially perpendicular to the line of sight is that a cumbersome structure is required to provide support while allowing the desired freedom of motion. Cumbersome structure is particularly to be avoided in a radio telescope because of the necessity for minimizing any distortion in the reflector structure.

The gain of a radio telescope increases as the diameter is increased; however, to take full advantage of increased diameter the surface must match a prescribed contour within a small fraction of a wave length of the operating frequency. A wave length of approximately 30 centimeters (1,000 megacycles frequency) is a practical choice for space communications and the use of even shorter waves may be desirable for certain purposes. A diameter of 500 wave lengths at 1,000 megacycles (150 meters) is a reasonable design objective for a radio telescope. For efficiency at 1,000 megacycles the contour of the reflector must at all points fit the design contour within a small fraction of a wave length, that is, of the order of three centimeters. To maintain the structure within this accuracy over its span of about 150 meters requires that principal strains in important structural members be held to less than about 200 micro-inches per inch. In contrast, the elastic limit of typical structural materials is not reached until strains in excess of 1,000 micro-inches per inch are reached. Thus, in the conventional approach to the design of a large radio telescope the structural materials are stressed only to a small fraction of the ordinary design limits. This results in the use of many times the weight of metal which would be required if it were sufficient merely to preserve integrity of the structure. Since the extra metal must be supported within these strict deflection limits the resulting increase in the required quantity of structural materials is disproportionate.

It is an object of this invention to provide a radio telescope of large aperture having improved performance and reduced weight. Another object of this invention is to provide a radio telescope having an infinite-stiffness structure. It is a further object of this invention to provide a radio telescope with a gyroscopically stabilized reflector. It is a further object of this invention to provide a two axis mount which can track through the vertical and at any other direction in space without excessive drive rates on either axis.

Figure 2A:
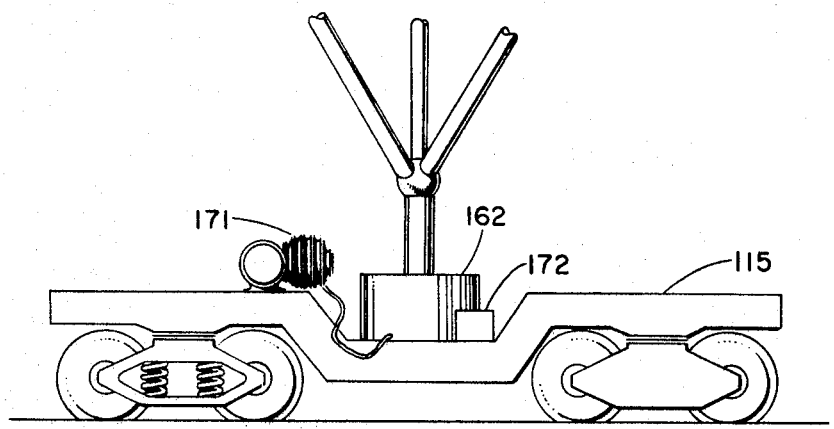
Figure 2B:
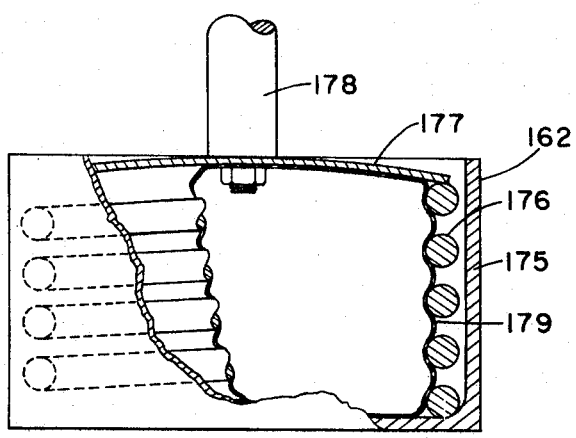
Figure 2C:
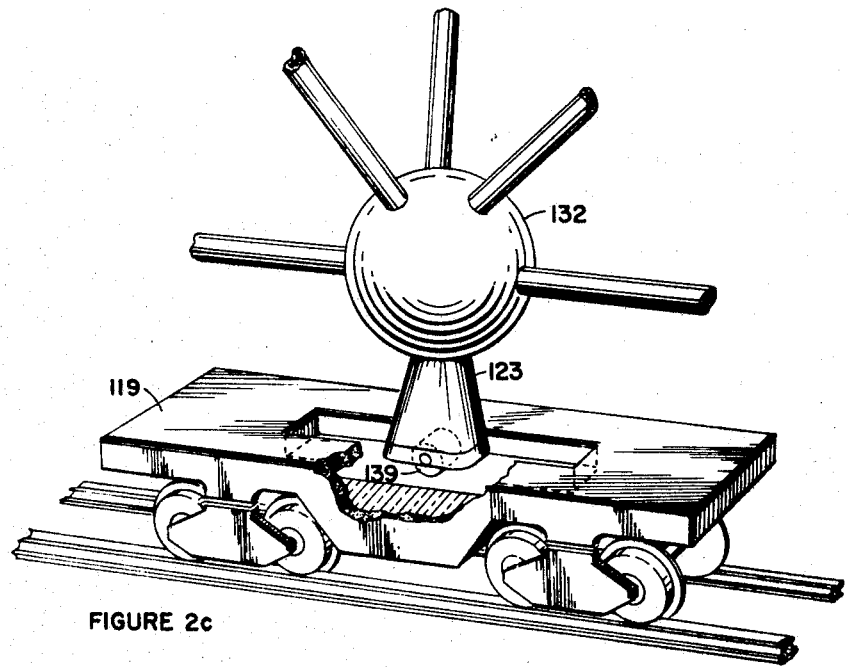
Figure 2D:
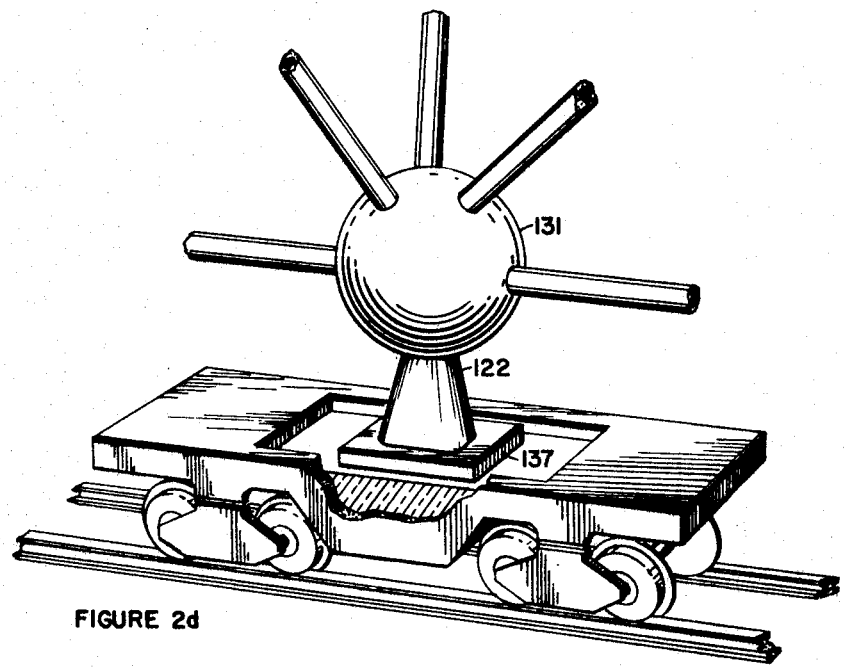
Figure 3:
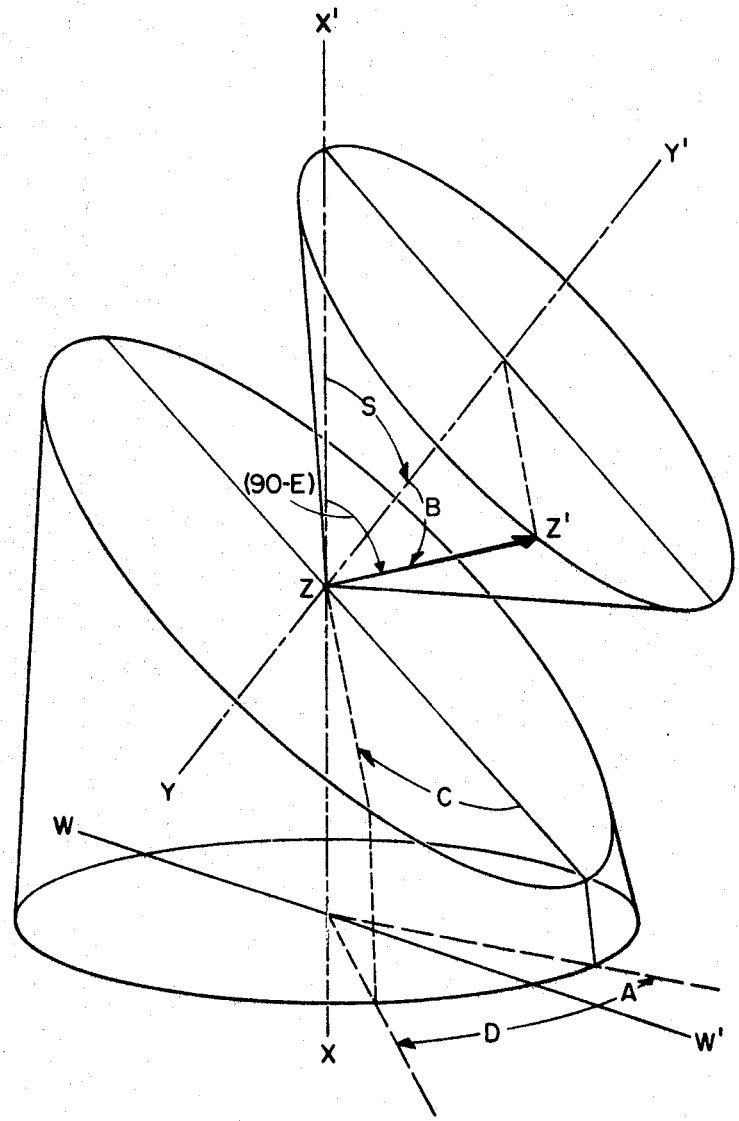
Figure 4:
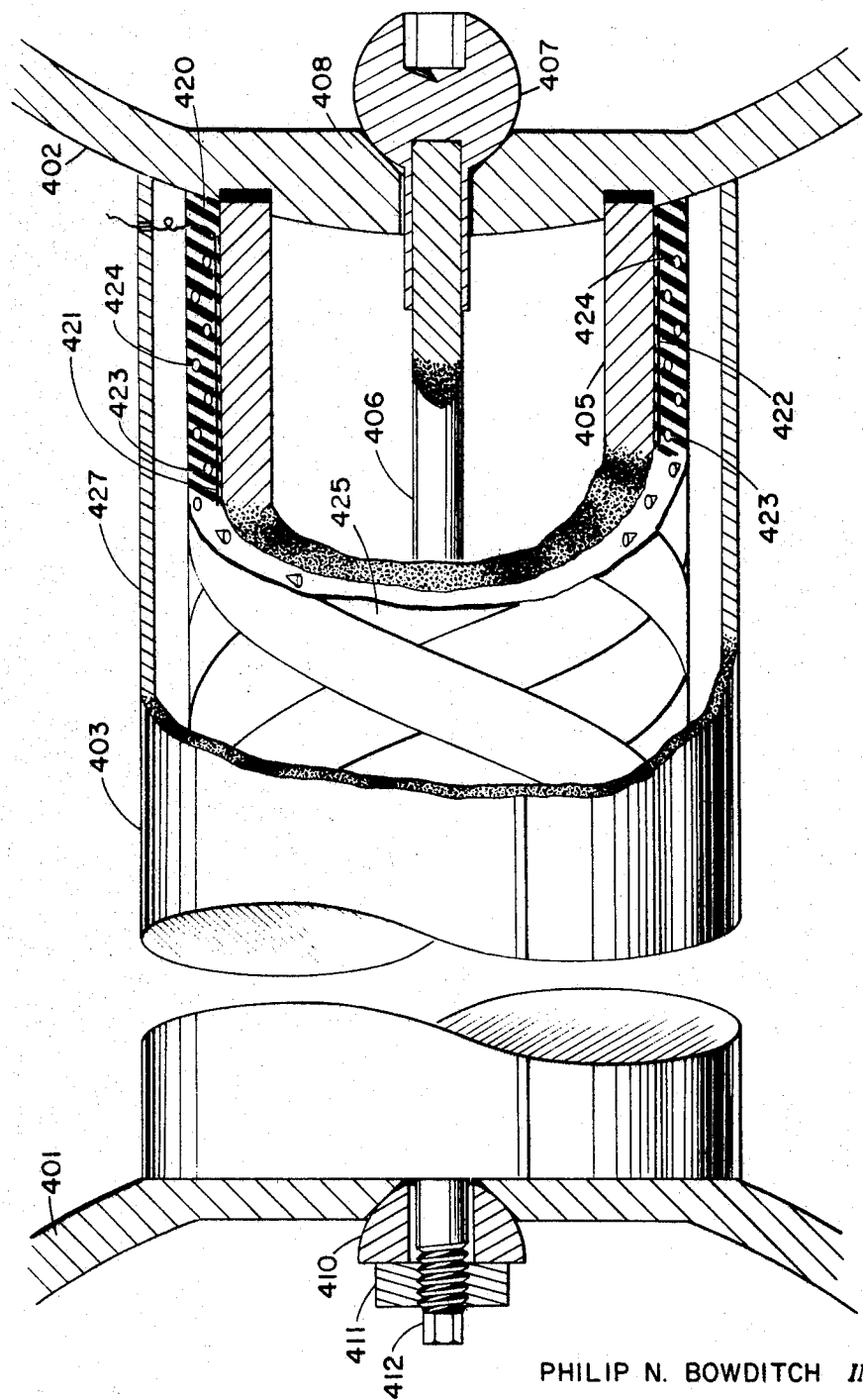
Figure 5:
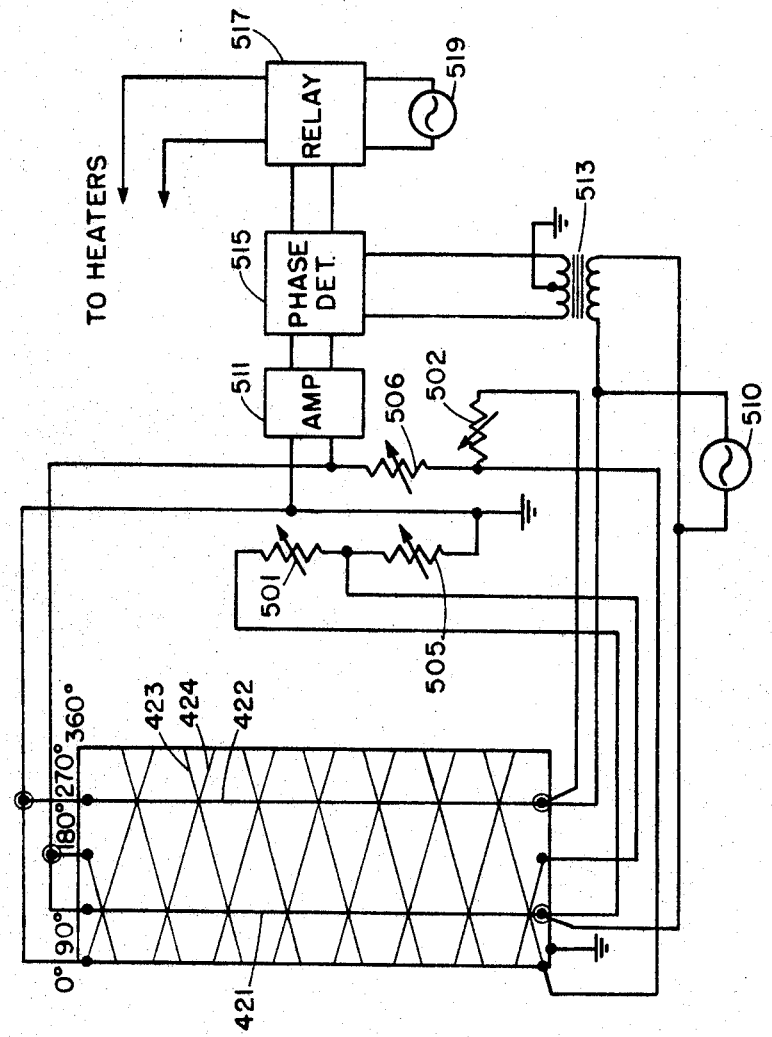
Figure 6:
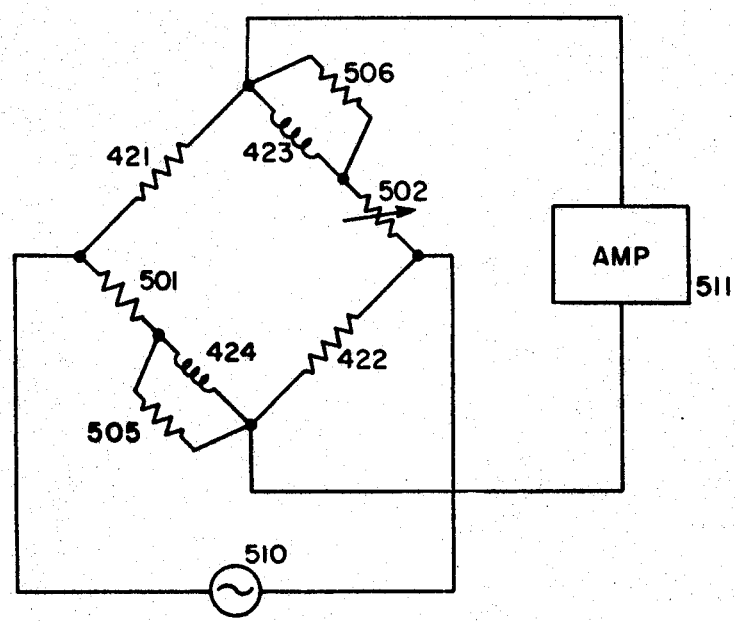

A feature of this invention is a two-axis system in which the axes are not perpendicular, but rather at an angle of about 45 degrees. This feature provides a large-diameter support base for the moving structures. Another feature is the matching of an off-center portion of a paraboloid of revolution to a large-diameter support ring in a plane substantially at a forty-five degree inclination to the axis of the paraboloid, whereby the profile of the structure is lowered and the effect of wind gusts is minimized. Starting from the broad base, the attachment of main support members to the reflector surface can be proportioned so that reaction to wind loads is balanced for minimum distortion. Further features and objects of this invention will be apprehended from the following specification and annexed drawings in which:

FIG. 1 is a partially cutaway view of an antenna constructed in accordance with this invention, FIGS. 2A, 2B, 2C and 2D are detailed drawings of features of FIG. 1, FIG. 3 is a geometrical diagram of the axis arrangement of the antenna of FIG. 1, FIG. 4 is a partially cutaway view of a temperature-regulated truss member, FIG. 5 is a schematic illustration of the wiring arrangement partially shown in FIG. 4, FIG. 6 is an electrical circuit diagram of a controller for an elementary strut of an infinite-stiffness truss, and FIG. 7 illustrates the preferred gimbal arrangement for the inertial system.

The foundation for the antenna comprises a circular track 101. A first rotating structure 103 carried on wheeled trucks 111, supports a second circular track 104 inclined at an angle approximately 45 degrees to the plane of the first track. A second rotating structure 110 is supported by the wheeled trucks 112, 113, 114, 115, 116, 117, 118, 119 on second circular track 104 and held in contact with the track 104 by tension on a swivel joint 120 located on the axis of the second rotating structure 110, either fixed to the first structure or anchored to the earth.

The construction of the first rotating structure is conventional as for traveling cranes. The second rotating structure rests on a ball joint 121, a first auxiliary support 122 having two degrees of freedom and a second auxiliary support 123 having one degree of freedom. These three supports determine a base plane for an infinite-stiffness truss 130. The infinite-stiffness truss supports the radio-telescope reflector 140 and by reason of its infinite stiffness, as defined below, establishes its shape without distortion despite wind-loading and changes in the distribution of gravity loads with motion of the antenna structure. The infinite-stiffness truss is a non-redundant pin-joint simple truss built up from a base triangle comprising joints 131, 132, and 133 to provide the necessary number of control points on the surface of the telescope reflector 140. The joint 133 is carried on the ball joint 121, joint 131 is supported from the first auxiliary support 122 by a sliding shoe 137. Joint 132 is supported on the second auxiliary support point 123 by a roller 139. The base triangle is constrained against rotation in its own plane by the roller 139 and ball joint 120. This support system substantially avoids transmission of bending forces.

The infinite-stiffness truss overcomes the effect of changes in load. Loads may be grouped into two classes, "predictable" and "unpredictable." To a certain degree of approximation the variation of load with rotation about the slant axis and with changes in the velocity and direction of the wind are predictable.

The simple truss need not have capacity to transmit all structural loads from the reflector to the three base plane supports. A number of "helper supports," 161, 162, 163, etc. transmit predictable forces directly between the reflector and the supporting trucks 113, 115, 116, etc. Preferably the characteristics of the helper members should complement those of the infinite-stiffness members.

The helpers should transmit a predetermined force independent of the length of the member. These should, therefore, have "infinite compliance." Hydraulic actuators have substantially the desired properties. Some resistance which increases with the rate of change of length is required to damp potential wind-excited oscillations of the structure.

FIG. 2A is a detail of the truck 115 showing the "helper" 162, a pump 171 and a controller 172. The "helper" 162 is further detailed in FIG. 2B illustrating a well-known type of pneumatic spring comprising a tub 175 which limits over-deflection, a soft coil spring 176, a header 177, attached to a strut 178 and a rubberized bag 179 contained within the spring 176, the header 177, and the tube 175. The bag is connected to the pump 171 and the controller 172 by which the fluid pressure in the bag 179 is varied to alter the force in the strut 178.

The controller 172 and controllers associated with the other helpers are all directed by a master computer located in the control center 180 which calculates the forces required from each helper by which it may minimize distorting forces on the infinite-stiffness truss 130.

The shape of the telescope reflector 140 is a portion of a paraboloid of revolution cut to make a comfortable fit with the tilted circular track 104, with the axis of the paraboloid forming the same angle with the slant axis as the slant axis forms with the vertical. In the resulting arrangement the axis Z–Z' of the paraboloid lies at the edge of the dish. Energy can be collected by a modified Cassegrainian arrangement. Energy from a distant source is reflected toward the focus 0 of the paraboloid. It is intercepted by a convex reflector 185 which focuses the energy into the observatory room 186 located at the hub of the structure. The observatory may be equipped to receive energy over a wide range of frequencies. Special receivers or transmitters for satellite communication may be installed as required. Providing an accessible place on the reflector structure for location of the radio frequency apparatus is desirable to eliminate R.F. plumbing problems.

By rotation about the slant axis the paraboloid may be directed toward the vertical or to any angle depressed from the vertical up to a maximum of twice the angle between the slant axis and vertical. Thus for a slant axis angle of 45 degrees the paraboloid may be directed at any angle of elevation from horizontal to vertical.

FIG. 3 illustrates the axis configuration, stripped of mechanical details. Axis WW' represents a reference azimuth direction, Axis XX' the local vertical and the axis of rotation for the first rotating structure. The angle A is the train angle, the angle of rotation of the first rotating structure relative to the azimuth reference WW'. YY' is the slant axis inclined from the vertical by the angle S. ZZ' is the line of sight, or the axis of the parabola, inclined from the slant axis by an angle B which is approximately the same as the angle S when S is 45 degrees. Angle C measures the rotation of the reflector about the slant axis. The angle E or elevation of the line of sight from the horizontal is a function primarily of the angle C but subject to errors of the angle S. The angle D, a measure of the deflection of the line of sight from the east direction, is determined by the train angle A and also by the second axis rotation angle C. With this arrangement it is possible to track a satellite smoothly at any angle including directly overhead. The angle of elevation E is related to the other angles as follows:

$$E = \sin^{-1}(\cos B \cos S - \sin B \sin S \cos C)$$

The deflection angle D is related to the other angles as follows:

$$D = A + \tan^{-1}\left[\frac{\sin B \sin C}{\cos S(\cos B + \sin B \cos C)}\right]$$

Simple trusses are well-known in the art and are characterized by the hinged connection of the elementary truss members. Each of the members of the truss transmits forces either in compression or in tension. Compression members are known as struts, tension members known as ties. Bending forces in the struts are avoided by the flexible connections characteristic of a simple truss. As used in bridges and roof structures, trusses are ordinarily designed so that struts at all times carry compression loads, and ties at all times carry tension. Because of the rotating of the antenna structure, supporting truss members may carry compression loads at one angle of slant axis rotation and tension loads at another.

A basic building block of the simple truss is the triangle, and in three dimensions a tetrahedron formed of four triangles, six struts in all. Despite hinge joints at the corners, the shape of a triangle of struts remains unchanged so long as the length of the members remains unchanged. By this principle any desired number of points on the surface of the reflector may be related to the base triangle. As mentioned above, it would be desirable to load the structural members of the truss to stress levels which ordinarily produce strains of the order of 1,000 micro-inches per inch. Such strain levels would result in an unacceptable deformation of the dish without a novel expedient embodied in this invention which permits members to be stressed to these levels without the resulting deformation. This is accomplished by changing the temperature of the struts in direct proportion to the applied stress. The thermal coefficient of expansion of steel is approximately six micro-inches per inch per degree Fahrenheit. Thus if the temperature of a member loaded in compression is increased by about 150 degrees Fahrenheit as the compressive load is increased from zero to full load, the length of the member remains substantially unchanged. This principle permits the construction of a strut which is said to have "infinite stiffness," that is, a strut whose length is substantially independent of the applied force. In the illustrated embodiment this is accomplished by applying to the strut electric strain-gage elements which are sensitive to changes in the length of the strut and heater windings to control the temperature of the strut. As the strain gages sense a shortening of the strut, the heater windings are activated to apply heat sufficient to eliminate the change in length. This is an application of the familiar negative feed-back principle. A truss made up of members whose length is controlled in this manner is herein defined as an "infinite-stiffness truss." Since the members are all controlled in length, the angles they form one with the other at the apexes of the basic tetrahedra comprising the truss remain constant. Accordingly it is not necessary that these joints be hinged where the members connect but merely that intersecting members be brought together at predetermined angles so that the lines of application of the forces converge at a point. A suitable mechanism for such connections is a spherical shell of convenient dimensions. This shell is pierced at the calculated angles for the attachments of struts.

FIG. 4 indicates two such spheres 401 and 402 interconnected by a strut 403. The strut comprises a tubular member 405 and a central tie 406. The tie has a spherical head 407 at one end which fits a seat 408 on the sphere 402. At the other end the tie 406 is fastened to the sphere 401 by means of a hemispherical washer 410 and a nut 411. Flats 412 at the end of the tie 406 facilitate tightening the nut 411. The tie 406 and its adjusting nut 411 permit biasing of the tubular member 405 at a predetermined level of compressive stress as determined by the design requirements. Instrumentation windings comprising three sets of constantan wires imbedded in epoxy resin 420 are applied to the tube 405. The resin 420 provides both electrical insulation and mechanical bonding with the member. A first set consists of two strain-measuring elements 421 and 422. Each element is made up of a number of parallel lengths to reduce the net resistance and each length comprises one of the primary legs of a bridge. The second set 423 is the clockwise lay of the temperature-compensating windings. This set comprises the basic part of another leg of the bridge. The third set 424 is the counterclockwise lay of the temperature-compensating windings. This set comprises the basic part of the remaining leg of the bridge. Over the instrumentation windings is laid a heater winding 425 of Nichrome ribbon wrapped around the member in a bifilar arrangement with approximately 50 percent coverage of the member surface. The ends of the various wires are secured to terminal rings clamped on the member ends. The heater strip is brought out at its center for grounding. Shielded cable is used to connect the appropriate terminals to the bridge-balancing an amplifier circuitry, which is located at suitably arranged distribution panels on the antenna structure. An outer cover 427 of metal provides protection for the windings and helps to minimize circumferential temperature differences.

The control circuitry is shown in a block diagram in FIG. 5 and in more conventional bridge circuitry FIG. 6. The balance of the bridge is adjusted and the temperature-compensating windings 423 and 424 padded by variable resistors 501, 502, 505 and 506. The resistor 501 connected between gage 421 and temperature-compensating winding 424 might be considered as the ambient level control and the variable resistor 502 may be considered as the set point adjustment. Shunt 505 is connected across the compensation winding 424 and the shunt 506 across the compensation winding 423. The shunts 505 and 506 provide fined adjustments which make up for slight differences between the temperature coefficients of the strain-sensitive elements and of the temperature-compensating windings. Two opposite corners are connected to the excitation supply 510. The other two corners are connected to the input of an amplifier 511. Through a transformer 513, the excitation voltage is also applied to a phase detector 515 which compares the phases of the amplifier output and the excitation supply. A relay 517 responsive to the phase detector 515 connects currents from a source 519 of power to the heaters 425 when the amplifier output is in one phase and shuts off the heaters when the amplifier output is in the other phase. An arrangement substantially as just described conveniently supplies up to 75 watts per foot to a strut of two-and-three-quarter-inch outside diameter and wall thickness of 0.065 inch having a compressive strength of more than 10,000 pounds.

An important feature of this design is that the first rotating structure need not be built as a piece of precision machinery. Considerable distortion and irregularity may be accommodated in it without distortion of the antenna reflector 140. Distortion in the structure 103 does have the effect that the elevation and azimuth of the antenna beam are not accurately determined by the relative rotation about train axis and slant axis. It is therefore impractical to point the telescope by assigning prescribed values to these angles. Rather the reflector is pointed by direct reference to inertial space. The infinite-stiffness structure carries, preferably in the observatory 186, a gyroscopically stabilized stable platform which may have any of several well-known configurations; such as that shown in FIG. 5 of C. S. Draper et al. Patent 2,752,793 dated July 3, 1956.

With a three-axis system the relations between antenna axis and gimbal axes will result in certain blind spots because of "gimbal lock." Appropriate four-axis systems may be employed. A gimbal system which is preferred is shown in FIG. 7 and has the following arrangement of gimbal axes. Outer gimbal 711 rotates around slant axis 713, the second gimbal 715 rotates about a horizontal axis 717 perpendicular to outer gimbal axis 727, and inner gimbal 721 rotates about the vertical axis 723 and the platform 727 rotates within the inner gimbal 721 on an axis 729 parallel to the polar axis of the earth about which a sidereal rate may be introduced.

Associated with the gyroscopically stabilized platform 727 are star-tracking telescopes of which three 751, 753, 755 are shown and pendulums 761 and 763 for indicating the local vertical. The pendulums are corrected for errors arising from antenna drive rates. By star tracking in clear weather, and reliance on inertial instruments 771, 773, 775 for periods of cloud cover, the telescope can be pointed in the desired direction with an accuracy commensurate with the beam width of the antenna. In the case of auto-tracking of a source of radiation, it is likewise unimportant that the drive system is not strictly uniform, so long as inertial elements are carried on the reflector structure to provide accurate feed-back of the dynamics.

It should be pointed out that the apparatus described above as embodying the present invention is general in nature and capable of execution by a designer with many variations, particularly as to the number and arrangement of the parts shown in the figures without departing from the spirit of the invention as defined by the appended claims.

The invention having thus been described, what is claimed is:

1. A radio telescope comprising a first circular track disposed in a substantially horizontal plane, a first support structure constrained to rotate about the vertical axis of said first track, said structure comprising a second circular track inclined in a plane at an angle of forty-five degrees from the horizontal, and a metallic reflector in the shape of a portion of a paraboloid of revolution supported on said second track and rotatable about a second axis normal to the plane of said track with the axis of said paraboloid which defines the line of sight of said telescope inclined at an angle of approximately forty-five degrees from said second axis, said portion being bounded by the intersection of said paraboloid surface with a cylindrical surface, wherein the axis of said cylindrical surface is substantially said second axis and wherein the axis of said paraboloid passes near the edge of said portion.

2. A radio telescope comprising a first circular track disposed in a substantially horizontal plane, a first support structure constrained to rotate about the substantially vertical axis of said first track, said structure comprising a second circular track inclined normal to an axis which makes with said vertical axis an angle midway between the maximum and minimum value of the angle between said vertical and the line of sight of said telescope, and a metallic reflector in the shape of a portion of a paraboloid of revolution rotatably supported on said second track with the axis of said paraboloid which defines the line of sight of said telescope inclined at an angle of approximately forty-five degrees from said second axis, said portion being bounded by the intersection of said paraboloid surface with a cylindrical surface, wherein the axis of said cylindrical surface is substantially said second axis and wherein the axis of said paraboloid passes near the edge of said portion.

3. A radio telescope comprising a first support structure constrained to rotate about a substantially vertical axis said structure comprising a circular track inclined in a plane at an angle of forty-five degrees from the horizontal, and a metallic reflector in the shape of a portion of a paraboloid of revolution supported on said track and rotatable about a second axis normal to the plane of said track with the axis of said paraboloid which defines the line of sight of said telescope inclined at an angle of approximately forty-five degrees from said second axis, said portion being bounded by the intersection of said paraboloid surface with a cylindrical surface, wherein the axis of said cylindrical surface makes with the axis of said paraboloid surface an angle of approximately forty-five degrees and wherein the axis of said paraboloid passes near the edge of said portion.

References Cited

UNITED STATES PATENTS

| 2,759,182 | 8/1956 | Chaffee | 343—757 X |
| 2,814,038 | 11/1957 | Miller | 343—915 |
| 3,141,168 | 7/1964 | Ashton | 343—765 X |

FOREIGN PATENTS

| 989,286 | 5/1951 | France. |

OTHER REFERENCES

Kennedy Antenna Equipment Catalog, received June 6, 1958, p. 12 relied on.

Electronics, vol. 33, No. 29, July 15, 1960, p. 19.

ELI LIEBERMAN, *Primary Examiner.*

C. L. JUSTUS, HERMAN KARL SAALBACH,
*Examiners.*

V. J. DI PIETRO, *Assistant Examiner.*